United States Patent Office 2,931,911
Patented Apr. 5, 1960

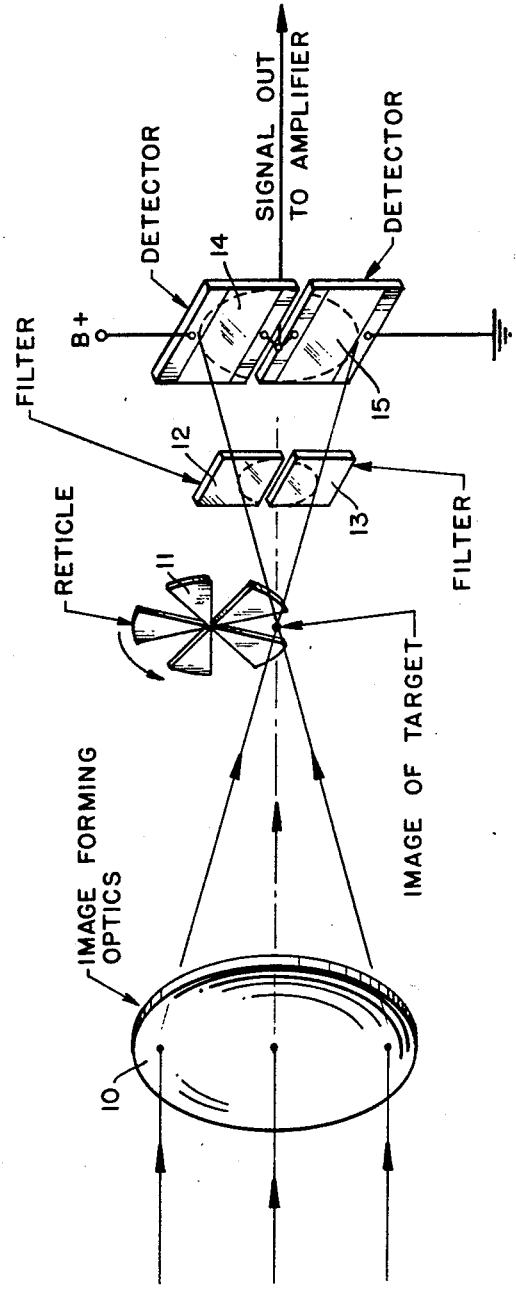

2,931,911
DETECTOR SYSTEM FOR OPTICAL SCANNERS

Lawrence W. Nichols, China Lake, Calif., assignor to the United States of America as represented by the Secretary of the Navy Application November 8, 1955, Serial No. 545,808

2 Claims. (Cl. 250—203)

(Granted under Title 35, U.S. Code (1952), sec. 266)

The invention described herein may be manufactured and used by or for the government of the United States of America for governmental purposes without the payment of any royalties thereon or therefor.

The present invention relates to detector systems for optical scanners and more particularly to a two-cell detector system for optical scanners.

The general purpose of the present invention is to enable an optical scanning system to detect objects of interest against radiant back-grounds, and to be used to identify colored objects or to detect an aircraft in the sky in the presence of clouds. The present invention may accomplish this by using an image forming optical system, a mechanical radiation modulator, two radiation detectors, and two optical filters.

A former method was to employ an image forming optical system, a mechanical radiation modulator, a single radiation detector, and a single optical filter, if desired. This former system functions as follows: The optical system forms an image of the desired field of view and the mechanical modulator, which is a pattern of slits, rotates in the plane of the image. Radiation from objects in the field of view is modulated by the rotating slits, and after passing through the modulator the radiation strikes the detector element. The output of the detector is an electrical impulse which is a function of the amount and spectral content of the incident radiation. If the radiation from every point in the field of view affects the detector to the same degree, the electrical output will be essentially D.C., but if there is a discontinuity in the radiation pattern for the field of view (i.e., an airplane against the sky), the change in radiation which occurs when the modulator passes over the image of the discontinuity will be evidenced as an A.C. component in the detector output. The A.C. generated may be used to indicate the presence of the object of interest. Disadvantages of this old method are that ti can use only one optical filter to enhance the contrast of the object of interest, which does not allow the system to take full advantage of spectral differences in object and background; there will be a mismatch of cell and load resistor for all but one intensity level if the resistance depends on the intensity of the field of view; and the electrical noise of the load resistor will add to that of the detector even though the load resistor is not contributing to the signal. Another old method employs an image forming optical system, a mechanical radiation modulator containing two optical filtering materials which are arranged into a suitable pattern for modulating radiation and a single radiation detector, and functions as follows: The optical system forms an image of the field of view and the modulator rotates in the plane of the image. The light entering the modulator will be affected according to its spectral character. If one of the filters will pass only blue light and one will pass only infra-red light, and the target is a jet airplane against the blue sky, then the radiation level will go up as the infra-red pass filter is on the jet airplane's image and down when the blue light pass filter is on the jet airplane's image. After the radiation passes through the modulator, it strikes the single sensitive cell and an electrical impulse results from the variation of energy and spectral content of the radiation. The A.C. generated may be used to indicate the presence of the object of interest. The disadvantages to this second old system are: The modulator element consisting of two optical filters is expensive and difficult to make; the optical filters are hard to change since they are part of a complex modulator; there will be a mismatch of cell and load resistor for all but one intensity level if the cell resistance depends on the intensity of the radiation of the field of view; filters which can be made into this type of modulator are usually limited to materials suitable for fabrication of small and finely detailed patterns thus restricting the materials to things which can be plated, evaporated or chemically deposited in the desired manner.

An object of the present invention, therefore, is to provide a detector for optical scanners using two optical filters to permit greater advantage to be taken of spectral contrasts.

Another object is to provide a detector using two cells in conjunction with two filters making it possible to select filters which will enhance the signal from the desired object while making signals from unwanted objects to cancel out.

A further object is to provide a detector using easily changeable filters.

A still further object is to provide a detector in which the usual load resistor is replaced with a radiation detector.

Other objects and many of the attendant advantages of this invention will be readily appreciated as the same become better understood by reference to the following detailed description when considered in connection with the accompanying drawing wherein:

The figure is a schematic drawing showing a two detector scanner of the invention.

The essential units of the preferred embodiment of the invention are an image forming optical system, a mechanical radiation modulator, two radiation detectors, and two optical filters. In the operation of the invention, the optical system 10 forms an image of the desired field of view. A mechanical modulator 11, which is a pattern of transparent and opaque slits, rotates in the plane of the image; the radiation from objects in the field is modulated by the rotating slits. The radiation that passes through the modulator 11 passes through the filters 12 and 13 and strikes the detector cells 14 and 15 respectively. With the radiation modulator in the focal plane of the optical system, the transparent and opaque slits will be rotating in the plane in which objects in the field of view are imaged. As each opaque slit moves across the image of the field of view intermittently it removes this radiation from each filter and detector, and as each transparent sector moves across the image of the field of view it admits intermittently radiation from each object in the field of view to each of the filter detector combinations. Each time radiation strikes a detector a signal will be generated. The filters 12 and 13 are positioned so that part of the radiation from the image enters each of the filters and some of the radiation passes through both of the filters. The detector cells 14 and 15 are placed so that each cell receives radiation through a different one of the filters. Neither filter passes radiation to both detector cells, each cell receives radiation from a different filter. In other words, approximately half of the image radiation passes through one filter and on to the first detector while the other half of the image radiation passes through the second filter and on to the second detector, since the facing edges of filters 12 and 13 are positioned so as to bisect the radiation from the image.

The detector cells 14 and 15 are connected in series and the signal output of the cells is taken at a point between the two cells. By taking the signal output at this point the outputs (signals generated by each detector) from the two cells are added algebraically; however, the outputs are 180° out of phase with each other and, consequently, like signals will subtract from one another and unlike signals will add to one another. This means that if no radiation strikes the detector cells no signal will be generated and if the same effective radiation strikes both cells, still no signal will be generated. A signal will be generated only if different amounts of effective radiation strike the two cells. The resultant signal at the junction of the two detectors can be introduced into a single conventional amplifier.

The optical filters 12 and 13 are chosen so that one filter will make the object of interest appear negative in contrast while the other filter will make the object of interest appear positive in contrast. Thus, when radiation from the object of interest passes through the modulator 11 and filters 12 and 13, it arrives at one cell with the effective radiation unattenuated and at the same time at the other cell with the effective radiation attenuated; this results in a signal. By selecting filters that make the object of interest positive in contrast through one filter and negative in contrast through the other a signal is obtained which is the sum of the signals produced by each cell.

The optical filters 12 and 13 are also chosen so that they affect the radiation from background objects in the same manner. The radiation arrives at the cells with equal effectiveness for both cells and no resulting signal.

The present system comprises two radiation receivers, using two filters one in front of each detector cell, and having one detector cell act as the load resistor for the other detector cell. This arrangement allows full advantage of spectral contrast to be taken by means of the two filters 12 and 13. It avoids manufacturing complicated modulators and allows a match of detector cell load resistance for all values of background intensity. The resistance of the two detector cells are affected in like manner by background radiation, thereby helping to keep them compatible in value over a wide range of background intensities. By replacing the usual load resistor with a radiation detector, as in the present invention, the electrical noise of a non-detecting element is replaced by desirable noise from a signal making element.

Alternate methods of constructing a two-cell detector system are as follows: One detector cell may be placed behind the other along the optical axis, with the first detector cell having a filter in front of its sensitive area. The sensitive area of the first detector cell is a pattern which allows a portion of the radiation to pass through and strike the filter and sensitive area of the second detector cell; this can be conveniently done with lead sulfide photo conductors;

One filter and two detector cells may be used where a filter is in front of one detector cell and the other detector cell has no filter in front of it;

The spectral response of the detector cells may be used to supplant the optical filters. In this case, while the detector cells are radiation sensitive they have different spectral responses and their response to spectra would approximate the effect derived from optical filters;

A system in which the detector cells are not connected together in series may be used where each cell puts out its own signal initially, and the output may be handled electronically as desired.

More than just two detector cells and optical filters may be used in a detector system for optical scanners, and the cells may be connected in series or parallel arrays. Using more than two detectors would increase the number of spectral regions scrutinized in the field of view.

Obviously, many modifications and variations of the present invention are possible in the light of the above teachings. It is therefore to be understood that within the scope of the appended claims the invention may be practiced otherwise than as specifically described.

What is claimed is:

1. A detector for optical scanners comprising an image forming optical system, a mechanical radiation modulator for modulating the image formed by the optical system and lying in the plane of said image, a plurality of radiation sensitive detectors, and a plurality of optical filters, said filters and radiation sensitive detectors positioned so that part of the modulated radiation from the image formed by the optical system passes through each of said filters and so that the modulated radiation incident on each radiation responsive device passes through a different filter.

2. A detector for optical scanners comprising an image forming optical system, a radiation modulator for modulating the image formed by the optical system, said radiation modulator lying in the plane of the image formed by said optical system, a plurality of radiation responsive devices connected in series, and a plurality of optical filters, said filters and radiation responsive devices positioned so that part of the modulated radiation from the image formed by the optical system passes through each of said filters and so that the modulated radiation incident on each radiation responsive device passes through a different filter.

References Cited in the file of this patent

UNITED STATES PATENTS

| | | | |
|---|---|---|---|
| 2,139,057 | Brockstedt | | Dec. 6, 1938 |
| 2,167,484 | Berry | | July 25, 1939 |
| 2,435,074 | Fry | | July 27, 1948 |
| 2,513,367 | Scott | | July 4, 1950 |
| 2,565,213 | Falkenstein | | Aug. 21, 1951 |
| 2,651,771 | Palmer | | Sept. 8, 1953 |
| 2,774,961 | Orlando | | Dec. 18, 1956 |